July 1, 1969

E. CARLSON 3,452,824

OSCILLATING HARROWS

Filed Oct. 2, 1964

INVENTOR
Elmer Carlson

BY Edward E. Bishop

ATTORNEY

United States Patent Office
3,452,824
Patented July 1, 1969

3,452,824
OSCILLATING HARROWS
Elmer Carlson, Wetaskiwin, Alberta, Canada; Agnes J. Carlson, executrix of said Elmer Carlson, deceased
Filed Oct. 2, 1964, Ser. No. 400,992
The portion of the term of the patent subsequent to July 1, 1985, has been disclaimed
Int. Cl. A01b 19/06
U.S. Cl. 172—54                                       2 Claims This invention relates in general to agricultural implements used for soil cultivation and, in particular, is an improvement over the agricultural implement described and claimed in my prior American Patent Number 2,280,372 issued Apr. 21, 1942.

While the apparatus illustrated in my prior patent worked with considerable efficiency, it suffered from a number of disadvantages.

For example:

(1) The reciprocating rotary motion of the harrow drags was coupled through a crank arrangement to the wheeled framework and the reciprocating rotary motion was dependent on forward motion of the hauling framework. This arrangement meant that the device could only be operated at low speeds if breakage or misoperation of the apparatus was to be kept at a minimum.

(2) Since each of the drags was coupled to a crank mechanism, the addition of any further drags to increase the width of the implement meant the addition of further crank mechanisms coupled to the wheel drive of the hauling framework.

(3) Since the crank driving mechaism was always coupled to the vehicle wheels, no satisfactory way to disengage the drags other than disassembly of the apparatus was found.

My improved mechanism is designed to overcome the above and other difficulties found in my previous implement and to provide a device which includes drags somewhat similar to the drags in my previous device but with only one of the drags coupled to a reciprocating mechanism on the hauling frame.

The remaining drags are then linked only to the framework and to the first drag so that rotary reciprocating motion of the first drag will be transmitted to the remaining drags.

With the reciprocating mechanism mounted on the framework and operating independently of forward motion of the framework, it will be obvious that the rotary reciprocating motion of the drags may be operated at any desired speed independently on the forward speed of the vehicle. In practice, I have found that the agricultural implement may be operated at two to three times the forward speed than had been possible heretofore and with the drags reciprocated and rotated at the best speed for efficient operation.

Further, I have formed my drag from a plurality of concentric rings linked together only at one side and with such links of flexible nature to allow maximum movement of the concentric rings in each drag. The connections between the adjacent drags and from the drags to the framework as well as from the one drag to the reciprocating mechanism are also of a flexible nature so that optimum movement of the drags will be achieved.

An additional advantage found in my improved implement is that it is only necessary to discontinue operation of the reciprocating mechanism on the hauling frame to cease the reciprocating rotary motion of all of the drags and so that the drags may then be piled on the framework for transportation to another location if desired.

The essence of my invention therefore is the provision of a hauling frame having a reciprocating mechanism with a plurality of drags and with one of the drags connected to the reciprocating mechanism. The remaining drags are connected to the framework and to the first drag so that rotary reciprocating motion imparted to the first drag will be transmitted to the remaining drags. In addition, each of my drags is composed of a plurality of concentric rings connected loosely together at one side and with each of the rings composed of equal sections hinged together.

Figure 1:
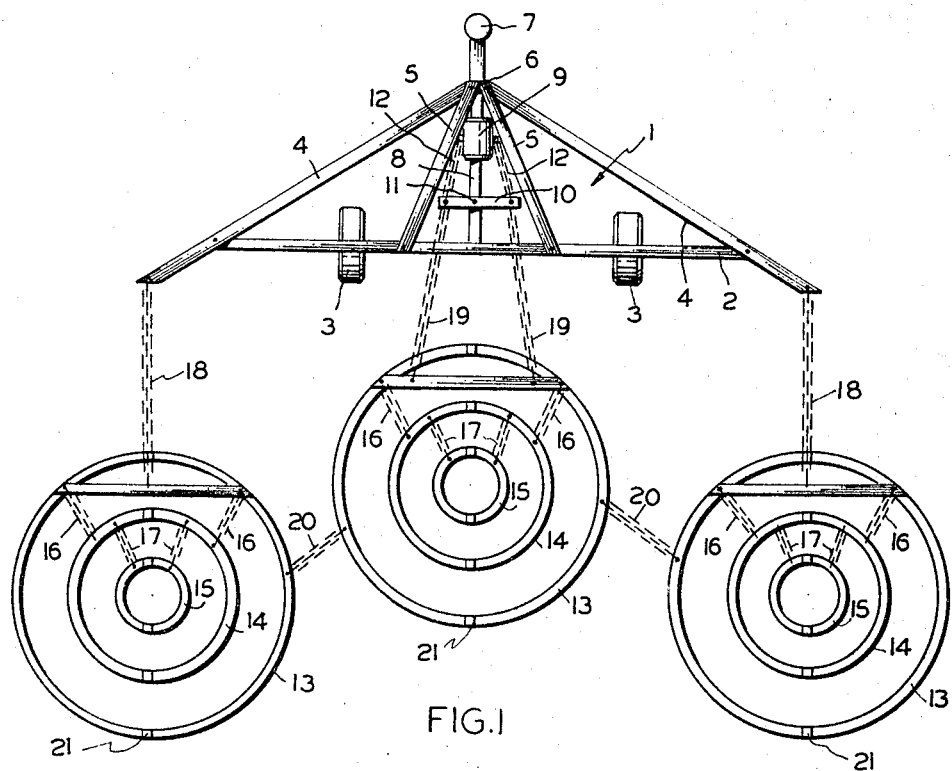
FIGURE 1 is a plan view of my improved apparatus.
Figure 2:
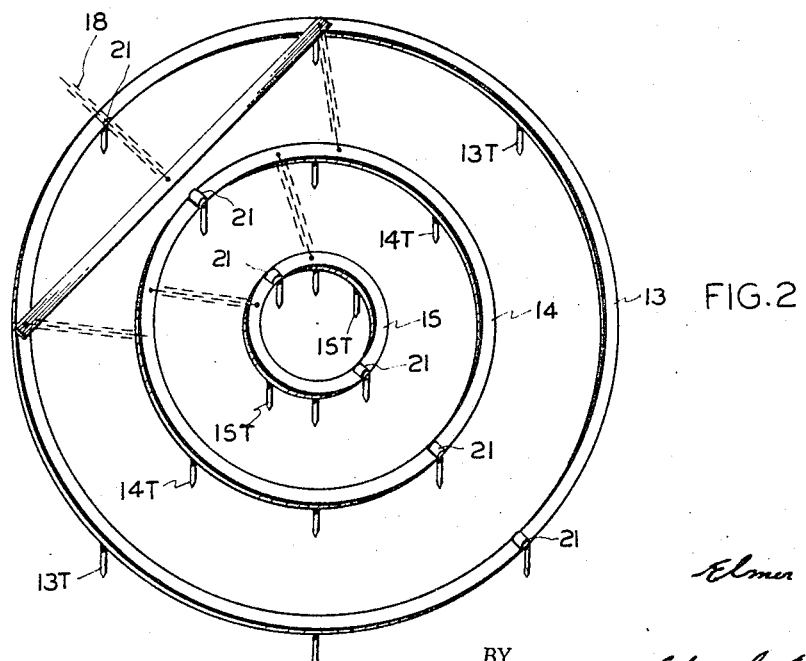
FIGURE 2 is an enlarged isometric view illustrating one of the drags.

My device consists of a hauling frame indicated generally at 1 and consisting of a cross piece 2 on which are mounted ground contacting wheels 3. Diagonal cross braces 4—4 and 5—5 are secured to the cross piece 2 and connected together at their forward end 6 with a trailer hitch or other attaching device 7 projecting forwardly for attachment to a tractor or like device.

An additional cross bar 8 extends between the forward end 6 of the frame and the cross piece 2 with a power unit 9 mounted rigidly to the bar and an oscillating bar 10 mounted rotatably at 11 to the bar. The oscillating bar 10 is coupled through chain links 12 to the power unit 9 so that operation of the power unit will oscillate the bar 10.

The drags for my device, each consist of a plurality of rings 13, 14 and 15 connected together at one side through the chains 16 and 17.

In the preferred embodiment illustrated the two outside drags are connected to the ends of the diagonal braces 4 through flexible chain members 18 while the center drag is connected to the ends of the oscillating bar 10 through the flexible chains 19.

The center drag is then connected to each of the outside drags through the flexible chain members 20.

The concentric rings 13, 14 and 15 in the drags are composed of equal half portions connected rotatably together as indicated at 21.

In actual practice the ends of the equal half portions of each ring are twisted at right angles to the portion to provide ears with matching openings formed in the ears and with simple bolt or rivet means passed through the openings to provide the necessary rotatable connections at 21.

In operation, the device is assembled as illustrated and described with the trailer hitch 7 connected to a suitable hauling vehicle as for example a tractor or the like.

The power unit 9 then is connected preferably to the power take off of the tractor so that it may be operated as desired independently of forward movement of the tractor.

With the power unit 9 not in operation, and with the tractor driven ahead, it will be obvious that the drags would be pulled behind the hauling frame 1 in the manner of conventional harrows.

When the actuating unit 9 is placed in operation, the reciprocating bar 10 will be oscillated and this will impart reciprocating rotary motion to the center drag. This reciprocating rotary motion will be transmitted through the chains 20 to the remaining drags and with the unit moving forwardly the drags will be moved in this reciprocating rotary motion as desired.

While we have shown a power unit 9 that could be connected to the power take off of the tractor, it will be obvious that any unit that would move the reciprocating bar 10 to impart reciprocating motion to the bar 10 would be satisfactory.

What I claim as my invention is:
1. A cultivating apparatus comprising, in combination; A hauling frame;

A plurality of circular drags, each consisting of a plurality of interconnected concentric rings having cultivating teeth;

A reciprocating mechanism mounted on the frame and operable independently of movement of the frame;

A pair of spaced flexible chains connecting the outside ring of one of the drags in the said plurality of drags to the said reciprocating mechanism whereby operation of the reciprocating mechanism will impart rotary reciprocating motion to the said one drag;

Flexible chain connections connecting the outside ring of each of the remaining drags to the said hauling frame;

Flexible chain connections connecting the outside ring of the said one drag to the said outside ring in each of the said remaining drags whereby rotary reciprocating motion of said one drag will impart rotary reciprocating motion to the said remaining drags.

2. The apparatus as claimed in claim 1 wherein the concentric rings in each drag are connected together at one side with spaced flexible chains.

References Cited

UNITED STATES PATENTS

| | | | |
|---|---|---|---|
| 1,574,605 | 2/1926 | Chartier | 172—524 |
| 2,280,372 | 4/1942 | Carlson | 172—56 |
| 3,066,744 | 12/1962 | Reuber | 172—97 X |

FOREIGN PATENTS 956,579    2/1950    France.

ANTONIO F. GUIDA, *Primary Examiner.*

ALAN E. KOPECKI, *Assistant Examiner.*

U.S. Cl. X.R.

172—627, 628